United States Patent
Rossi et al.

(10) Patent No.: US 8,751,355 B2
(45) Date of Patent: Jun. 10, 2014

(54) SYSTEM AND METHOD FOR CREDIT ENHANCING A DEBT ISSUANCE AND CREATING A PRESENT VALUE INVESTABLE ARBITRAGE

(76) Inventors: Stephen Edward Rossi, Naples, FL (US); Nitin Mehta, New Delhi (IN)

( * ) Notice: Subject to any disclaimer, the term of this patent is extended or adjusted under 35 U.S.C. 154(b) by 46 days.

(21) Appl. No.: 13/248,037

(22) Filed: Nov. 5, 2011

(65) Prior Publication Data
US 2012/0078815 A1    Mar. 29, 2012

Related U.S. Application Data

(60) Provisional application No. 61/387,837, filed on Sep. 29, 2010.

(51) Int. Cl.
*G06Q 40/00*       (2012.01)
*G06Q 40/04*       (2012.01)
*G06Q 40/06*       (2012.01)

(52) U.S. Cl.
USPC .......................................................... 705/36

(58) Field of Classification Search
USPC .......................................................... 705/36
See application file for complete search history.

(56) References Cited

U.S. PATENT DOCUMENTS 7,162,448 B2 *   1/2007   Madoff et al. .................. 705/37
7,606,749 B2 *   10/2009   Curry et al. ..................... 705/35

* cited by examiner

*Primary Examiner* — Clifford Madamba (57) ABSTRACT

The debt issuance of a company are credit enhanced via an investment platform wherein the company's issuances and investments are both subject to a master netting agreement between common counterparties, thereby creating a fully hedged transaction with an investible present value monetization of the future income stream for purposes of reinvesting. The Investment Platform comprises a proprietary Cross Settlement, Credit Enhancement, Risk-Mitigation and Netting System that has a hedged investment structure that automatically qualifies for credit enhancement wherein non-investment grade debt issuances can be transformed into investment grade debt issuances. The Investment Platform is powered by a proprietary investment algorithm and make-whole algorithm that matches movements in a selected benchmark rate or indices. It provides a matched supply of capital to reinvest as the core of the structure recycles the investment capital by a method of monetizing the future income stream, while simultaneously matching and hedging the investment.

16 Claims, 9 Drawing Sheets

Overview of Auction System

Registration Process

FIG. 3

Process Flow – Placing a Bid

FIG. 4

Process Flow – Bid Acceptance

FIG. 5

Process Flow – Order Settlement

FIG. 6

Process Flow – Credit Enhancement

FIG. 7

Process Flow – Pooling and Aggregation

Process Flow – Credit Enhancement and Pricing

SYSTEM AND METHOD FOR CREDIT ENHANCING A DEBT ISSUANCE AND CREATING A PRESENT VALUE INVESTABLE ARBITRAGE

CROSS-REFERENCE TO RELATED APPLICATIONS

This application claims priority to provisional application No. 61/387,837, filed on Sep. 29, 2010, entitled "System and Method For Credit Enhancing a Debt Issuance and Creating a Present Value Investable Arbitrage."

STATEMENT REGARDING FEDERALLY SPONSORED RESEARCH OR DEVELOPMENT

Not Applicable

OTHER PUBLICATIONS

Section 3(c)(1) funds and 3(c)(7) funds of the Securities Act of 1933;
Rule 144A safe harbor registration requirements of the Securities Act of 1933
Investment Company Act of 1940
Regulation D under the Securities Act of 1933
New York Debtor & Creditor Law, §151—Right Of Set Off Against Unmatured Debts
Financial Institutions Reform, Recovery, and Enforcement Act of 1989 (FIRREA)
U.S. Bankruptcy Code, see 12 U.S.C. Sec. 1821(e)(8)(D)(ii)
Title IX of the Bankruptcy Act of 2005
FDI regulations—12 U.S.C. Section 1831i; 12 USC §1821(e)(8)(A)(i); 12 USC §1821(e)(8)(E); 12 USC §1821(e)(8)(A)(iii) (FDIC as receiver); 12 USC §1821(e)(8)(E)(iii) (FDIC as conservator); 12 USC §1821(e)(8)(A)(iii) (FDIC as receiver); 12 USC §1821(e)(8)(E)(iii); 12 U.S.C. §1821(e)(8)(D)(vii)
FDI Act-safe harbor provisions
Federal Deposit Insurance Corporation (FDIC)
Federal Deposit Insurance Act-Section 1817(a)(1)
International Swaps and Derivatives Association (ISDA)-Agreements-Various

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to the field of financial securities, investment banking, tax law, credit rating, credit enhancement, electronic exchanges, generally accepted accounting principles and securities law, and more particularly, to innovative financial processes; and creative solutions to corporate finance problems, using techniques that minimize risk, reduce issuance cost and mitigate interest rate changes and their distribution to various third party investors through an Investment Platform that consists of investment methods, products, and systems.

2. Description of the Related Art

Presently, there is a large array of different types of investment opportunities and securities offerings that are available to investors from a variety of issuers including equity, quasi-equity, certificates of deposit, medium term notes, preferred securities, debentures, and other forms of secured and unsecured debt. Each of these different types of opportunities can offer investors different financial and performance characteristics (e.g., with respect to financial stability, rate of return, and investment structure). Many such existing types of financing and investment opportunities, however, have drawbacks that include that they do not: 1) adequately protect the investor(s) with respect to the loss of the investor(s)' capital contribution to the investment; 2) protect the expected cash flow of the investment (e.g., in the case of default) 3) have a risk reward ratio that is suitable for non-qualified investors (but rather have a high risk reward ratio geared solely for institutional investors) or 4) otherwise have the requisite features to be readily available or suitable for the non-qualified investor.

For example, in most investments the investor provides a party with capital in exchange for an equity interest in some financial enterprise, a debt obligation of someone's, beneficial interests in equity or debt, or for other consideration. Such investments typically carry the risk for investors that they may lose all or part of their investment if the financial product fails or upon the occurrence of certain financial events.

The most common method of addressing this risk of loss is to have the investment guaranteed, credit enhanced or insured by a financially sound party to the transaction or third party, such as an insurance company or other financial institution or insurance portfolio. When repayment of an investment is assured by an insurance company, such assurance is typically evidenced by some form of insurance policy. When repayment of an investment is assured by another type of financial institution, it typically takes the form of a guarantee.

There exist many methods of portfolio insurance such as OBPI (Option Based Portfolio Insurance), CPPI (Constant Proportion Portfolio Insurance), and Stop-loss, etc. Equity and fixed income based structured products offered by financial institutions in the 1980's widely used the CPPI method.

Usually, institutional asset managers don't directly bear the market risks on the asset portfolios they manage for their customers. This is not necessarily true when they insure or guarantee the value of the portfolios they manage or other portfolios. In that case, consequences of sudden large market's decrease may be totally borne by the institution providing the insurance or guarantee, depending on the method of insurance they use.

In the 1980's, one form of guaranteed investment became popular: the principal protected note ("PPN"). A PPN is typically a promissory note (a type of debt security and a negotiable instrument regulated by article 3 of the Uniform Commercial Code), issued by an entity, the repayment of principal (and sometimes interest) of which is either entirely or partially guaranteed by a bank or other financial institution. What is unique about many PPN's is that their return is tied to the performance of a separate type of investment, such as one or more investment funds (sometimes referred to as a reference fund), a basket of stocks, commodities, indices, funds or other items. The PPN permits the investor to participate, to some extent, in the performance of that other type of investment without taking all or a portion of the risk of the loss of the corpus of the investor's investment. One drawback often seen in PPN's is that many of them do not pay out any return until the maturity of the PPN. Another drawback is that is that if the PPN is not fully guaranteed in all situations, the investor still bears the risk of loss of all or a portion of its investment if the conditions under which the note is not fully guaranteed occur.

In some prior art investment methods, an investor invests in a particular structured product which uses partial or no portfolio insurance or guarantees to protect the investor contributions. Such methods, however, are tied to the fundamentals and susceptible to market risks of the particular investment.

There is currently a great demand and activity in the investment and financial community related to high credit quality credit enhanced issuances. With respect to holding PPNs or similar forms of debt issuances as a principal form of investment, PPNs can provide a stable financial vehicle but they suffer from certain drawbacks such as the lack of an active trading market for the PPN thereby providing the investor with market liquidity based on current net asset value (NAV) of the investment. In addition, even in the field of structured note products, known techniques do not take advantage of the many features of PPNs to appropriately benefit investors such as to protect principal contributions of investors.

The financial markets worldwide are always looking for new forms of financial securities that can raise additional money for corporations or other financial entities and are attractive to investors. Companies have financial product engineers who are constantly looking for better structures for securities in order to raise more money for corporations, provide investment products attractive and suitable for investors and provide fees to the investment banking company. The financial securities must comply and operate within applicable tax, securities and other laws and regulations.

It would be desirable for methods, systems and products to be developed that take full advantage of the broadening the field to non-investment grade issuers in order to broaden the investible universe of marketable securities.

3. Objects and Advantages

The main objective of the invention is to:

A) Create a superior Open-offer Securities pricing, reverse inquiry auction and distribution platform for issuers of debt securities.

B) Create a superior risk mitigated investment process that can be offered to non-qualified as well as institutional investors.

C) Create a superior instrument that investors will prefer to invest in comparison to alternative structured products, PPN investment products or any other innovative financial products.

D) Create a superior hedged investment structure financial product that automatically qualifies for credit enhancement wherein non-investment grade debt issuances can be transformed into investment grade debt issuances.

E) Create a superior instrument that may raise more money for a corporation than traditional issuances of debt, convertible debt and/or equity.

F) Allow any financial institution issuing debt securities to be able to compete better financially and for investors with domestic and international financial entities that issue similar debt securities.

G) Create an innovative security that bundles traditional debt and equity/quasi-equity and an investment in an investment unit.

H) Create an innovative security that bundles jumbo certificates of deposit ("CD"), I/O (interest only) CD Strips, P/O (principal only) CD Strips, non-cumulative perpetual preferred stock and annuities and an investment in an investment unit.

I) Create a security that has the ability to replace and replenish the equity of a company and provide balance sheet enhancement pursuant to laws and regulation.

J) Create a superior hedged investment structured financial product wherein the First Party can purchase a Second Party's existing Debt Instrument issuances in a secondary market transaction from a new party (the "Fourth Party").

SUMMARY OF THE INVENTION

The present invention relates to the creation of a Cross Settlement, Credit Enhancement, Risk-Mitigation and Netting System (the "Platform") for the issuances and investments of securities of global institutions (including but not limited to; Banks, Insurance Companies, Corporates and Governments). The Platform is powered by a proprietary algorithm based investment engine that matches variable pay-ins and pay-outs based on movements in selected benchmark rate(s) or indices. The Platform generates a matched supply of capital to reinvest as the core of the structure and recycles the investment capital by a method of monetizing the future income stream while simultaneously matching and hedging the investment in a cash-settled capital raising process with counterparty participants (a.k.a. "Issuer Participants", "Investor Participants" and the "Second Party").

The system provides a variety of investment options to its Second Party participants including for buying and selling a plurality of securities including but not limited to; equity, certificates of deposit, medium term notes, preferred securities, debentures, and other forms of secured and unsecured debt.

The system could provide external or internal credit enhancement through its inherent low risk investment structure and algorithm based pricing such that it receives a favorable rating review and third party guarantees at a reasonable cost by creating a hedged structure with netting rights, over-collateralization, cash collateral accounts, reserve accounts, pooling of securities, etc.

The system enhances the yield on the credit enhanced debt issuances but at a less than normal cost thus creating an investment arbitrage. The system creates techniques used to improve the credit rating of an asset-backed debt security, generally to get an investment grade rating from a bond rating agency and to improve the marketability of the securities to investors.

An embodiment of the invention provides a system and method for buying or selling assets held by a Participant where the assets that are purchased and or sold, are bundled into a security or a reference note.

An embodiment of the invention provides a system for trading assets online.

Many other embodiments involving systems, system components, and methods are proposed, including an automated arbitrage and current value monetization system.

OVERVIEW OF SYSTEM

The counterparty participants are pre-qualified and pre-approved and their detailed financial data (e.g. capital call reports in the case of banks) is available electronically on the Investment Platform's database before they log on to the system to take part in an OfferBid-ask auction system. The Second Parties provide specific details relating to maturity, price, yield, discount, type of securities and principal amount, etc., of the securities issuances (the "Debt Instrument") (that includes the universe of varieties and forms of debt instrument securities), that they wish to offer to sell and/or buy on the platform. Thereafter, the platform via the investment engine automatically generates and offers a yield for a basket of securities based on a variable rate algorithm benchmark (such as a comparable term and maturity of U.S. Treasuries) for the counterparty participant's securities by extrapolating the input data that has been keyed-in by the counterparty participant with the counterparty participant's latest and most current financial data. The yields on the securities and investments are variable and move in tandem with movements in the benchmark prices.

The Platform also licenses certain issuers or licensees (the "First Party") to offer their investment grade rated debentures (that includes the universe of varieties and forms of debt instrument securities). These licensees are newly formed bankruptcy remote offshore special purpose entities ("SPE") that are created by the Platform specifically for the purpose of holding certain assets and issuing credit enhanced investment grade rated debentures. Based upon the proprietary algorithm, a licensee obtains a favorable rating (investment grade rating) for each unique transaction on closing and the Platform calculates and fixes a price for their investment grade rated securities.

The yields on the entire OfferBid-ask quotations generated on the Platform of all participants and licensees are always "at market" and the system produces an arbitrage or spread opportunity between the bid and ask security pricing based upon the securities unique credit rating weighting and credit profiling.

A preferred embodiment of the invention is a unique process and system in that each transaction with a counterparty participant is completely stand-alone and; independent of and fully hedged from other transactions with other counterparty participant's. The principal and interest risk for the licensee is perfectly matched on the transaction, whereby each transaction is an independent investment holding structure that can be credit enhanced on its own merit.

In one aspect, the invention provides an auction system and method used in concert with a reverse inquiry underwriting process. The new system and process creates an optimal equilibrium for the Participants and has the same advantages or opportunities for competing, pricing, allocating and redistributing private investment dollars to large or smaller issuers. An auction system and process in accordance with the invention, employs a mathematical investment algorithm that lets the market set a price that is optimal for both the Issuer Participant and the Investor Participant purchasers of the debt issuances in the Issuer Participant. The result is a price that better reflects what the market is truly willing to pay for the debt issuances.

One embodiment of the invention provides a system and method for determining the final offering price and allocations of debt in an Issuer Participant or trust. An Issuer Participant offers an initial price/yield range for its contemplated debt issuances. Then, any Investor Participant (whether institutional or non-qualified investors) who is interested in accepting the reverse inquiry offering price/yield of the counterparty participant in the auction, can do so through a secure and encrypted internet website. The result is a uniformly fair market distribution whereby the Issuer Participant offers its debt issuances through a reverse inquiry auction process and price/yield allocations are more efficiently allocated in a market negotiation-acceptance-delivery process between issuer, the Platform as licensor and investor rather than in a traditional investment banking capital raising process. Each party receives what they want or the trade is disbanded.

A reverse inquiry debt offering employing an auction in accordance with a present embodiment of the invention differs substantially from traditional underwritten private offerings in which underwriters employ a "book building" sales technique, the price at which debt securities are sold is determined by negotiation. In offerings conducted by auction in accordance with the invention, debt will generally be sold directly to the Investor Participants by an SPE that is licensed by the Platform as a sub-Issuer Participant at a price determined by the Investor Participants accepting the reverse inquiry bid offering of the Platform. A debt offering auction in accordance with the invention provides a free market method of determining valuation based upon market demand rather than the "book building" process of traditional underwritten offerings. Bids may be subject to a minimum yield or range set by the Investor Participants. Offerings conducted by such auction process may be run on the basis of a specific yield the Issuer Participant is willing to pay on its debt or amount of capital to be raised.

In an auction in accordance with the invention, the offering can be more readily priced at the maximum valuation that the market can bear and said debt issuances may be placed with those seeking long-term investment. The automation of the reverse inquiry auction offering process enables Issuer Participants to raise smaller amounts of capital than may typically required by underwriters in traditional offerings.

Debt offerings utilizing an auction in accordance with the invention will be conducted through the use of a software system developed with the algorithm engine providing key pricing inputs to the system. This system will handle multiple aspects of the offering process, including registration, pricing, custody, servicing and maturity.

Debt offering transactions conducted by the auction will be available to institutional investors but in another embodiment, the system can also be made available to Qualified and Non-Qualified Purchasers.

The system will, starting from the bid with the highest price or yield and working downward, compute the matched Investor Participant offer bid quantities (the "OfferBids"). The Auction System will establish the price at which all Investor Participants whose bids are included in the OfferBids and will allocate the debt securities matched to the corresponding OfferBid (the "Clearing Price"). It will be appreciated that the pricing may be conducted by a computer software algorithm that has access to (prospective) issuer OfferBids. A typical user of the System is a General Investor-non-qualified investor, institutional investor, etc. who buys debt offerings and other similar capital offerings.

Registration Process

Prospective Issuer Participants and Investor Participants (collectively "Customer" or "User") are referred by investment managers to the web based auction platform.

The Participant logs unto the registration system and enters his details, for example, in the case of a bank, it would be the Fed ID and for any listed company it could be the SEC database filing number. In case neither is available, the Participant inputs key financial data into a database aggregator. Customer's data is collated and based upon his financial data parameters, he is approved for registration. The User ordinarily will access the Auction System through the issuance of a system generated UserID and Password as part of the prequalification process for approval to participate in an auction. Once approved to participate in an auction, an Account number, User ID, password, etc. is allotted by the Securities Auction and Bid-Ask platform and delivered to the Participant. Participant's transaction limits, if any, are determined and communicated to the customer. In the Preferred Embodiment, the User provides his/her own communications interface facilities, which can be from and computer linked into the internet to enter bids into the Auction System, to modify or cancel these bids, to review the status of these bids, to track the history of the bids, and, finally, to determine what bids were successful and ultimately filled.

Bid Process

In a preferred embodiment, the User will reach his/her account via the Internet. In the preferred embodiment, the Issuer Participant, using a system computer generated UserID and Password, logs on to the encrypted web-based system and in a reverse auction enquiry, inputs data requirements, such as including but not limited to, type of investments to-be-issued, offer yields, term, duration, maturity, increments, fees, etc. (the "OfferBid"). Through the independent information source database (which, in the Preferred Embodiment is a web site), the user will have access to a Prospectus or other description of the offering and other information content.

In the Preferred Embodiment, bids submitted via an on-line system will be routed via the brokerage Auction Management System to an Auction Server. The Investor Participant Users will indicate the particular security (typically by entering the counterparty participant name or their User ID), the number of debt securities they wish to purchase, and the price they are willing to pay. In the Preferred Embodiment, the Auction Server will collect and store all bids submitted for all offerings.

The algorithm engine checks and verifies whether the OfferBid is within acceptable predefined parameters. If the answer is yes, then the system formulates a draft deal information sheet matching the Issuer Participant's requirements as per the data input by him. If the answer is no, then the system formulates a counter offer from the Investor Participant based upon the Issuer Participants credit profile.

Concurrently, the auction administrator reverts to the Issuer Participant of the availability of investment grade rated corporate debt securities that accompany the draft deal information sheet. A floor and cap of transaction limits are defined in the deal information sheet, which is issued a transaction code by the system.

If the Issuer Participant's initial OfferBid in the auction does not meet the parametric criteria of the Investor Participant's, the Issuer Participant can amend his parameters and place a additional re-bid(s) ("Counter OfferBids") for X number of additional times.

Settlement Process

In the Preferred Embodiment, at the end of an auction period, the Auction Server will match the submitted bids for a particular offering via an investment algorithm. Once an OfferBid or a Counter OfferBid have been accepted by the system, the accepted bid (the "Final OfferBid") is logged in the bid database. In the Preferred Embodiment, filled orders are routed back to the Auction Management System to route the fills to the individual accounts of successful Issuer Participants and Investor Participants. The Issuer Participants and the Investor Participants are given T+1 closing time.

Pursuant to system generated escrow instructions, the Issuer Participants send the Securities it is selling and cash for any securities it is purchasing, simultaneously, while the Investor Participant sends cash to the clearing agent for securities it is purchasing. All securities and cash proceeds are kept in escrow pending the final closing and settlement.

Custody, Servicing and Maturity.

Upon verification and matching of securities and cash purchase consideration, the clearing agent sends cash to the securities issuing participants while the securities are transferred in the name of the Investor Participants and held under safe-keeping with a Custodian Bank.

All agreements are lodged with the settlement/escrow agent. Settlements take place and the settlement agent takes possession of securities. All the variable interest inflows move directly into the settlement agent's escrow account. Any surplus inflows are distributed amongst the beneficiary parties. The settlement agent settles interest payments on all securities on an ongoing basis.

Upon any event of default of an issuer's securities, an automatic offset is triggered by the custodian/settlement agent. The event of default causes an acceleration of the securities and based upon the algorithm, a default valuation formula is calculated and the system generates a net settlement amount owed or owing between the parties. Any residual amounts payable or receivable upon settlement are physically transferred by the parties into the custodians account as part of the netting process. The parties offset and net their obligations based upon their contractual commitments.

Based on a Participants credit profile and independent credit evaluation and rating, the System uses an Algorithm engine to generate a riskless investment hedge against default of an Issuer Participant as internal credit enhancement and subsequently in real-time generates the Pricing for said Credit Enhancement and further secures it with a wrap financial guaranty insurance policy from a Guarantee Issuing Company(s). The System becomes an intelligent, iterative and interactive System that learns from its own internal pricing algorithms as well as taking environment inputs from other market forces of demand and supply.

BRIEF DESCRIPTION OF THE DRAWINGS

Preferred exemplary embodiments of the present invention are described here with reference to the accompanying drawings, which form a part of this disclosure, and in which like numerals denote like elements.

DETAILED DESCRIPTION OF THE PREFERRED EMBODIMENTS

A method and system is disclosed for the creation of a Cross Settlement, Risk-Mitigation and Netting System (the "System") for the issuances and investments of securities of global institutions (including but not limited to Banks, Insurance Companies, Corporates and Governments). The platform is powered by a proprietary algorithm based investment engine that matches variable pay-ins and payouts based upon movements in benchmark rates.

Figure 1:
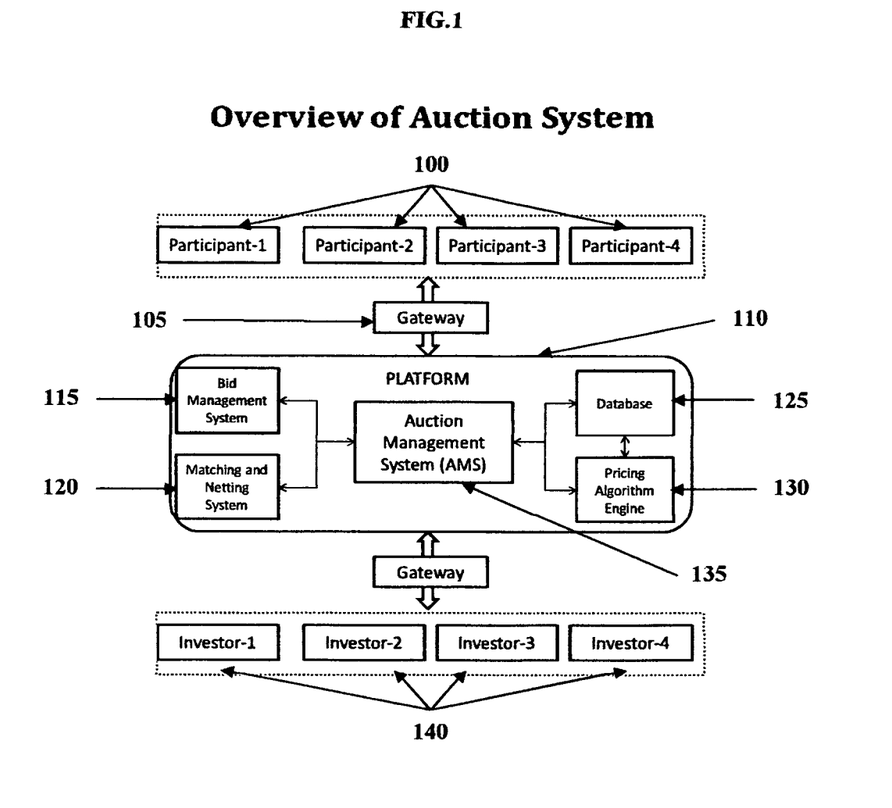
FIG. 1 is a perspective view of the flow diagram of the "Overview of Auction System" illustrating steps in accordance with an embodiment of the present invention.

Referring to the illustrative drawing of FIG. 1, there is shown a flow diagram for the "Overview of the Auction System". The Platform 110 enables participants to instantly issue, credit enhance, securitize, hedge, sell, buy, refinance, repurchase (repo) notes or debt securities or create credit enhanced and guaranteed financial products through an electronic bid-ask system that allows bids to be submitted by various Issuer participants for either investments (e.g. the yield-to-maturity desired by an investor or issuer), secured debt (e.g. the interest rate desired by a investor or issuer) or the repurchase or reverse repurchase of instruments or debt portfolios. An Issuer Participant 100 that has received a UserID and password to submit an offer and/or a bid, enters the Platform 110 through Gateway 105 to a specially designed web site auction Platform 110, which an embodiment is anticipated to be a secure and encrypted website. Once inside the secure Auction Management System 135, each Issuer Participant 100 simultaneously submits their debt offerings, which are queued in the Database 125 on the Platform 110 as a percentage yield-to-maturity offered for new issue debt instruments (the "Debenture"). The Bid Management System 115 will select the winning offers from Issuer Participants 100 that submit successful OfferBids. To qualify for acceptance by the SPE, the bid of an Issuer Participant 100 must contain a positive arbitrage. This is determined by the Pricing Algorithm Engine 130. Once logged into the Auction Management System 135 all Issuer Participant 100 offers are submitted during a pre-determined auction period. The various Investor Participants 140 that have been prequalified and received a UserID and password to submit an offer and/or a bid, enters the Platform 110 through Gateway 105. The Matching and Netting System 120 of the Platform 110 matches the offers based upon the parameters established in the Pricing Algorithm Engine 130. All offers will be strictly confidential and will not be disclosed publicly or to other counterparty Issuer or Investor Participants. Offers will be ranked in order from the greatest to the lowest Spread and selection of winning offers will start with those counterparty participants offering the greatest Spread. All other offers not meeting the system requirements will be rejected.

One embodiment of the invention, as explained in FIG. 1, shows that the platform can also be viewed as an electronic exchange that allows Participants (i.e. investors, issuers corporates, governments and banks) to come together to match their requirements in generating, but not limited to, insured and uninsured deposits, preferred capital, principal protected notes, secured loans, and investment grade rated investments.

Figure 2:
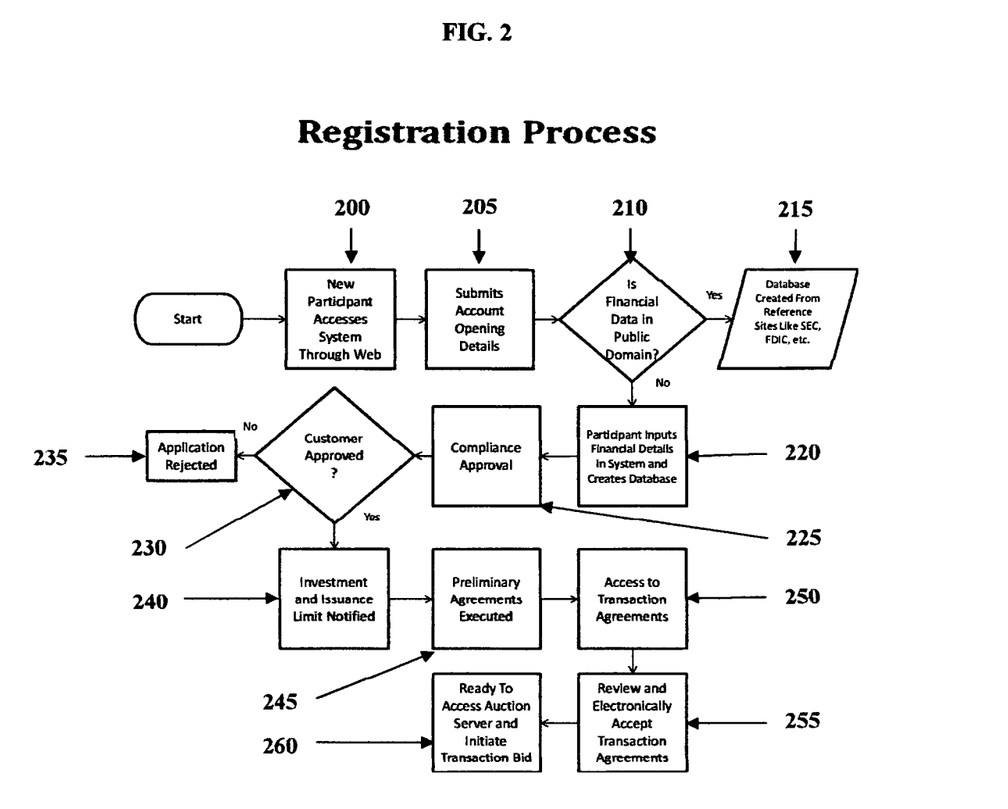
FIG. 2 is a perspective view of a flow diagram of the "Registration Process" of the present invention.

Referring to the illustrative drawing of FIG. 2, there is shown a flow diagram for "Registration Process" of opening new accounts to be able to participate on the reverse inquiry auction. The New Participant 200 accesses the auction Platform 110 through a fully secured and encrypted Gateway 105 to the web-interface system 200 and submits account opening details 205. The system runs a check to determine if the New Participant's 200 financial data is in the public domain 210 with records access pulled from a database created from reference (Example from Securities and Exchange Commission (SEC) and the Federal Deposit Insurance Corporation (FDIC)) 215. If the details are not publically available, the Participant 200 inputs Financial Details into the system Creates Database 220 and move through to Compliance Approval 225. The system either approves the customer 230 or rejects the application 235 to participate on the reverse inquiry auction platform. If the customer 230 is approved to participate, the system determines the investment and issuance limits 240 of the Participant 200. Preliminary agreements are executed 245 and the Participant is provided access to transaction agreements 250 to review and electronically accept transaction agreements 255 and the Participant 200 is now ready to access auction server 135 and initiate a transaction reverse bid 260.

Figure 3:
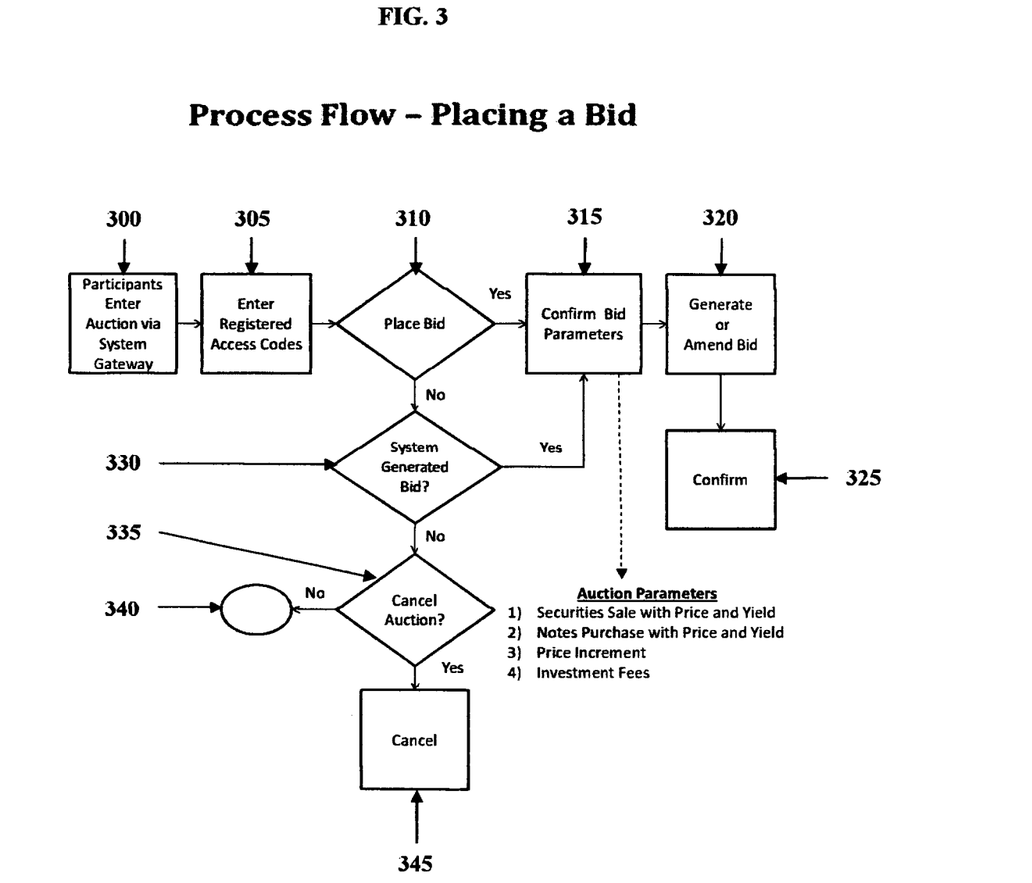
FIG. 3 is a perspective view of a flow diagram of the "Process Flow—Placing a Bid" of the present invention.

Referring to the illustrative drawing of FIG. 3, there is shown a flow diagram for the "Process Flow—Placing a Bid" of a process of creating, modifying or confirming bids using the auction system during the auction. Participants 100 and 140 Access Auction Server via Gateway 300 and Enter Registered Access Codes 305 (previously issued User-ID and Password). The Participants 100 and 140 UserID's are retained by the system during the auction as necessary. Security keys are used to authenticate the user. Participant 100 enters the auction parameters and Places a Bid 310 and the auction system 125 makes a determination whether to create an auction and if affirmative, moves on and the Issuer Participant 100 Confirms Bid Parameters 315 to Generate or Amend Bid parameters 320 and reconfirm 325. The types of securities being offered; 1) Medium Term Notes, Asset Backed Securities, Guaranteed Notes, Preference Shares, Certificates of Deposit, etc. with Price and Yield; 2) Debt Securities Sale, with Price and Yield; 3) Price Increment; and 4) Commissions and Fees. If the auction parameters are in agreement between the Participants 100 and 140, the auction proceeds or is modified. The System Generates the Bid 330 or system modifies auction parameters stored in auction server database. If bid parameters of Participant 100 and 140 do not match, then the system Cancels Auction (335, 340, and 345) and changes the status of the Auction restricted by status field parameters found in real-time auction server database 215. When ready to close auction, the auction server database 215 is updated with the auction parameters as well as to change the Status of the auction.

Figure 4:
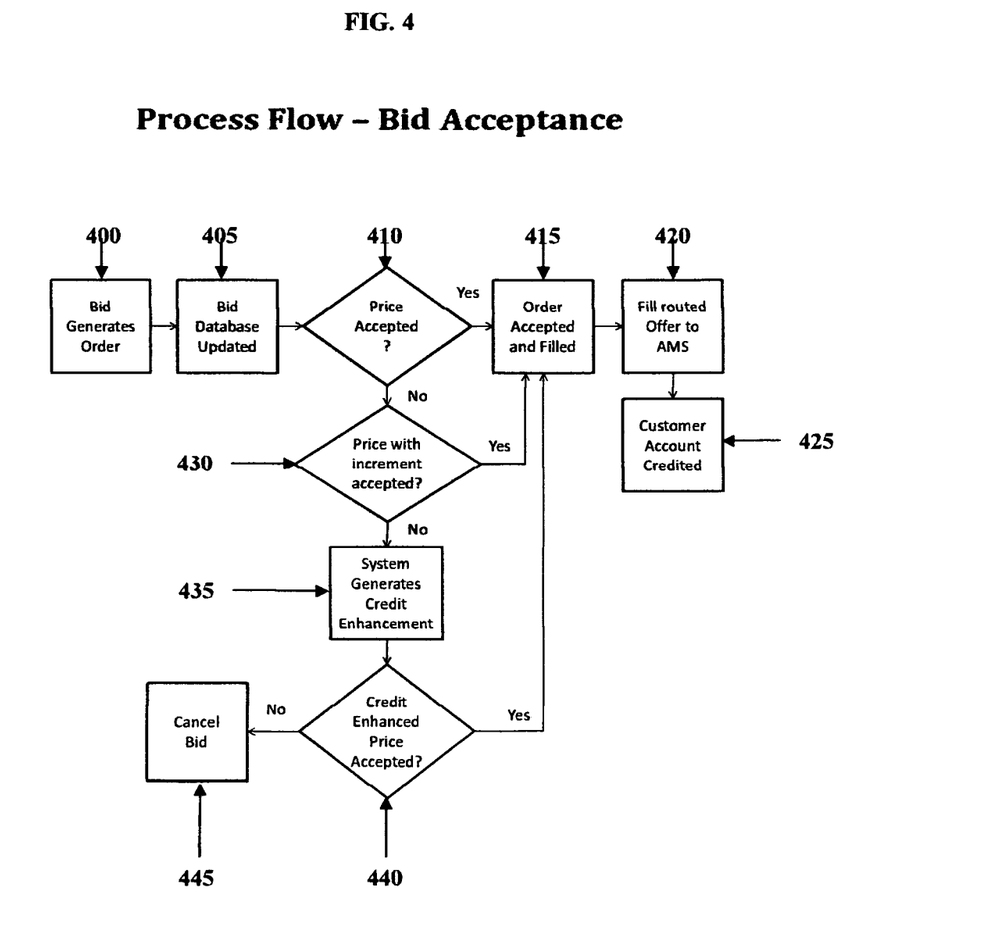
FIG. 4 is a perspective view of a flow diagram of the "Process Flow—Bid Acceptance" of the present invention.

Referring to the illustrative drawing of FIG. 4, there is shown a flow diagram for the "Process Flow—Bid Acceptance" process during the auction of creating, modifying or cancelling bids during an auction using the Auction Management System Server 135. Filling or running the auction involves determining the operating parameters 315 from the auction and database 405 tables. Next, the fill step 415 involves determining the complete state of all bids in the auction from the database tables 405. Once the auction has run to completion, the fill status of each bid is updated in the database tables 405 and the transactions are logged in the Accepted Bid Table. Bid Generates Order 400 and the Bid Database is Updated 405. If the bid offer 330 of Participant 100 is accepted 410 by Participant 140, the System Generates a Credit Enhancement 435 in real-time approval from a third party credit enhancer and if the Credit Enhanced Price Accepted 440, the Order is Accepted and Filled 415 and Fill routed Offer to Auction Management System (AMS) 420. Alternatively, if the Credit Enhanced Price is not Accepted 440, the Bid is Cancelled 445. Once an order has been routed to the auction server from the auction management system 420, then the auction server database 405 comes into play. Customer's (Participant 100 and 140) Account is Credited and/or Debited or both 425.

Figure 5:
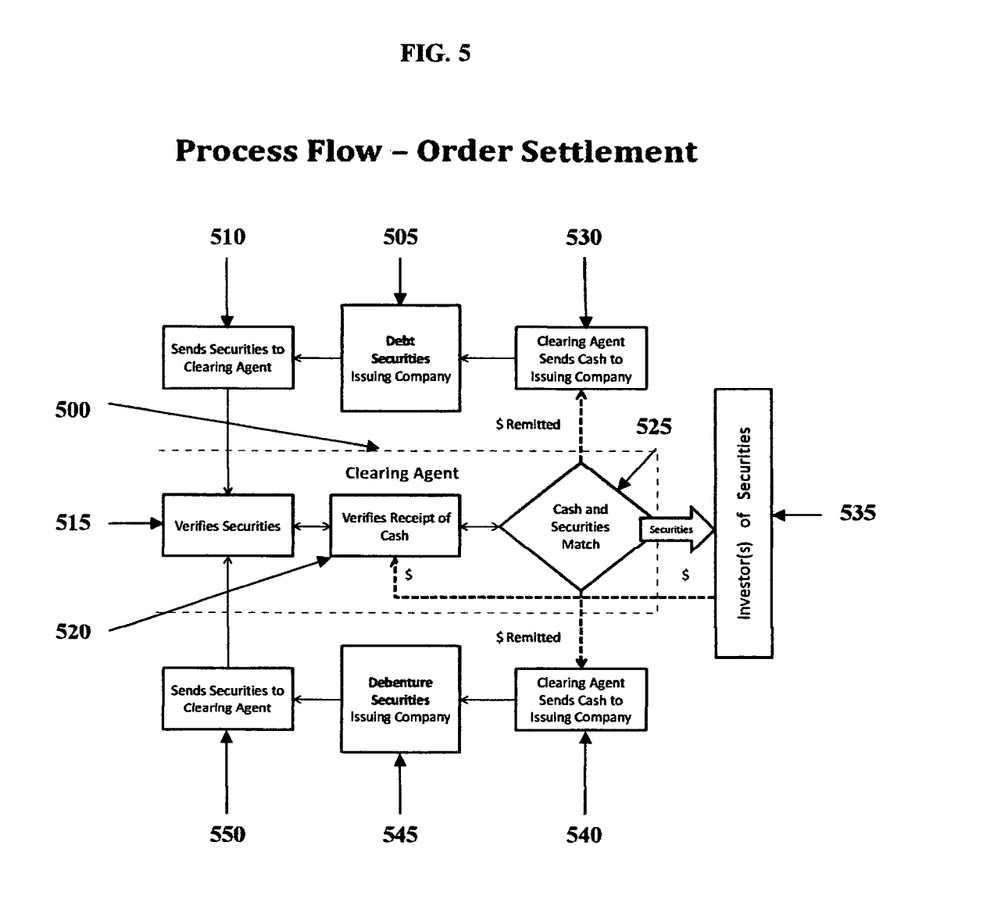
FIG. 5 is a perspective view of a flow diagram of the "Process Flow—Order Settlement" of the present invention.

Referring to the illustrative drawing of FIG. 5, there is shown a flow diagram for the "Process Flow—Order Settlement" process of settling or closing bids using the Auction Server between the matched Issuer Participants 100 with the corresponding Investor Participants 140. Debt Securities and cash of Issuing Company 505 (Participant 100) and Debt Securities and cash of Issuing Company 505 (Participant 140) are sent through the Auction Management System (AMS) 420 which in turn Sends Securities to Clearing Agent 500. Clearing Agent 500 Verifies Securities 515 and simultaneously Verifies Receipt of Cash 520. Clearing Agent 500 matches Cash and Securities 525 and Clearing Agent 500 Sends Cash to Debenture Securities Issuing Company 545 and securities to Investor(s) of Securities 535 (aka Participant 140). Investment grade rated Debenture Securities of Issuing Company 545 are simultaneously sent to Clearing Agent 500 for verification (550, 515) and delivery to purchaser Participant 100 and/or 140).

Figure 6:
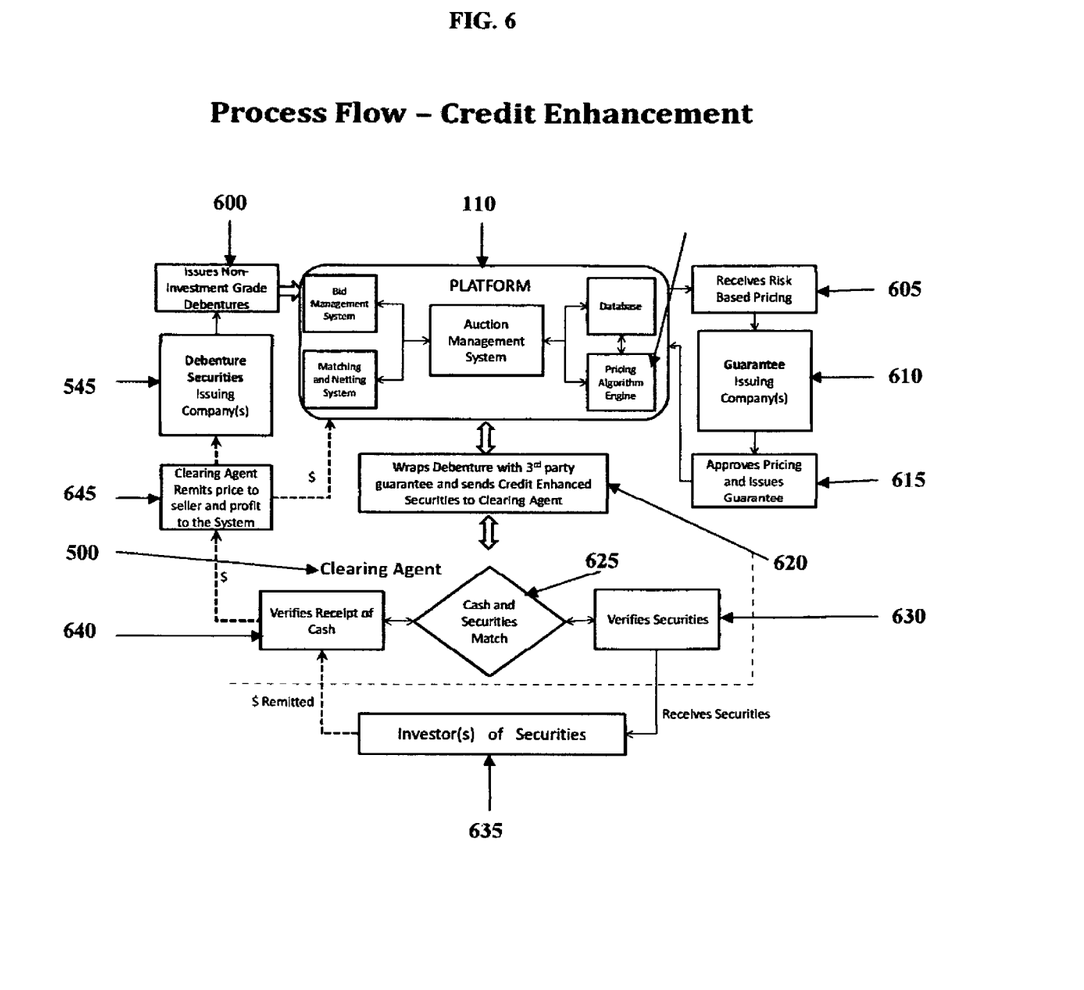
FIG. 6 is a perspective view of a flow diagram of the "Process Flow—Credit Enhancement" of the present invention.

Referring to the illustrative drawing of FIG. 6, there is shown a flow diagram for "Process Flow—Credit Enhancement" showing the credit enhancement process of creating investment grade rated issuances through the Platform 110. There are two general classifications of credit enhancements: third-party or external credit enhancement and internal credit enhancement. With external credit enhancement, a third party pledges its own creditworthiness and guarantees repayment in exchange for a fee. Examples of this external credit enhancement are 1) surety bonds, which are insurance policies that reimburse for any losses; 2) a wrapped security, whereby an investment grade-rated financial guarantor or monoline insurance companies provides a promise to reimburse the issuer trust for losses up to a specified amount; 3) a letter of credit from a bank to provide a specified cash amount to reimburse the issuing trust for any cash shortfalls from the collateral up to the required credit support amount; and 4) a cash collateral account where the issuer borrows the required credit support amount from a commercial bank and then deposits this cash in short-term commercial paper that has the highest available credit quality. Because a cash collateral account is an actual deposit of cash, a downgrade of the cash collateral provider would not result in a similar downgrade of the security.

The second general form of credit enhancement is internal credit enhancement or self-enhancement, which is generally done by the issuer itself through a variety of methods such as: 1) excess spread, which is typically one of the first defenses against loss. In the example of a loan portfolio, even if some of the underlying loan payments are late or default, the coupon payment can still be made; 2) overcollateralization where the face value of the underlying securities or loan portfolio is larger than the security it backs; and 3) a reserve account is created to reimburse the issuing trust for losses up to the amount allocated for the reserve. To increase credit support, the reserve account will often be non-declining throughout the life of the security, meaning that the account will increase proportionally up to some specified level as the outstanding debt is paid off. The purpose of credit enhanced issuances is to improve acceptability of product as an investment, improve risk perception and the related perception of rate of return and thus reduce the yield applicable and get a favorable yield on the transaction. Credit enhancement is further achieved through master netting agreements that are executed between the participants on the system. An embodiment of the invention as illustrated in FIG. 7, both external and internal credit enhancement features are incorporated into the Platform.

The Debenture Securities Issuing Company 600 simultaneously bids to sell its debentures as an Issuer Participant 100 through the system/platform 110 at a certain price and yield. The auction management system 135 calculates the fair market value of the security and creates a matching hedge for the security. The system generates pricing for third party external credit enhancement beyond the internal credit enhancement features generated by the systems structure. The third party credit enhancer, Guarantee Issuing Company(s) 610, Receives Risk Based Pricing 605, wraps the internal credit enhancements, approves the pricing and issues a financial guaranty policy 615. The system wraps the debenture with the external financial guaranty policy 620 and issues the debenture to the investor via the clearing agent 500 who in turn remits purchase consideration to the Debenture Securities Issuing Company 545 of securities (seller) and any profit on the trade to the Auction Management System 135 or Platform 110.

Figure 7:
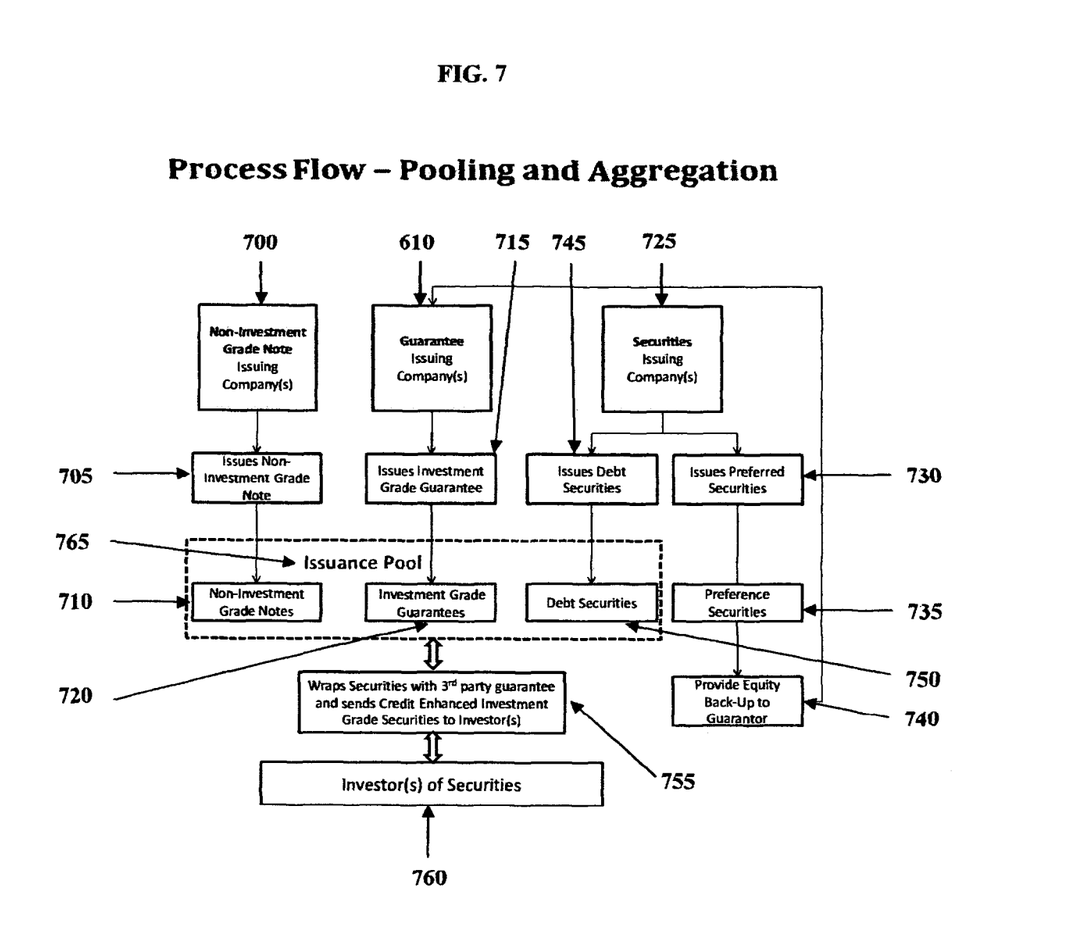
FIG. 7 is a perspective view of a flow diagram of the "Process Flow—Pooling and Aggregation" of the present invention.

Referring to the illustrative drawing of FIG. 7, there is shown a flow diagram for the "Process Flow—Pooling and Aggregation" of compartmentalizing various assets on the Platform 110 as a cash collateral account or reserve account and providing one of the key elements that creates the credit enhancement for the investment grade rated issuances. The Non-investment grade note issuing company (the "First Party") 700 Issues a Non-Investment Grade Note 705 and the Platform 110 is the purchaser of said note. The Platform 110 aggregates the Non-Investment Grade Note 710 as part of an Issuance Pool 765 of securities. The Guarantee issuing company 610 issues Investment Grade Guarantee 715 and the System 615 is the purchaser of this guarantee. The Platform 110 keeps Investment Grade Guarantee 720 as part of an Issuance Pool 765 of securities. The Platform 110 issues a counter-guarantee back to Guarantee Issuing Company(s) 610 and the Platform 110 is the purchaser and keeps the Securities in an Issuance Pool 765 of securities. The Securities issuing company 725 Issues Debt Securities 745 and Preferred Securities 730 and the System is the purchaser and keeps the Preferred Securities 730 segregated to Provide Equity Back-Up to Guarantor 740 (Guarantee Issuing Company(s) 610). The Issuance pool 765 Wraps Securities with third party external guarantee 755 and sends Credit Enhanced Investment Grade Securities 755 to Investor(s) 760.

Figure 8:
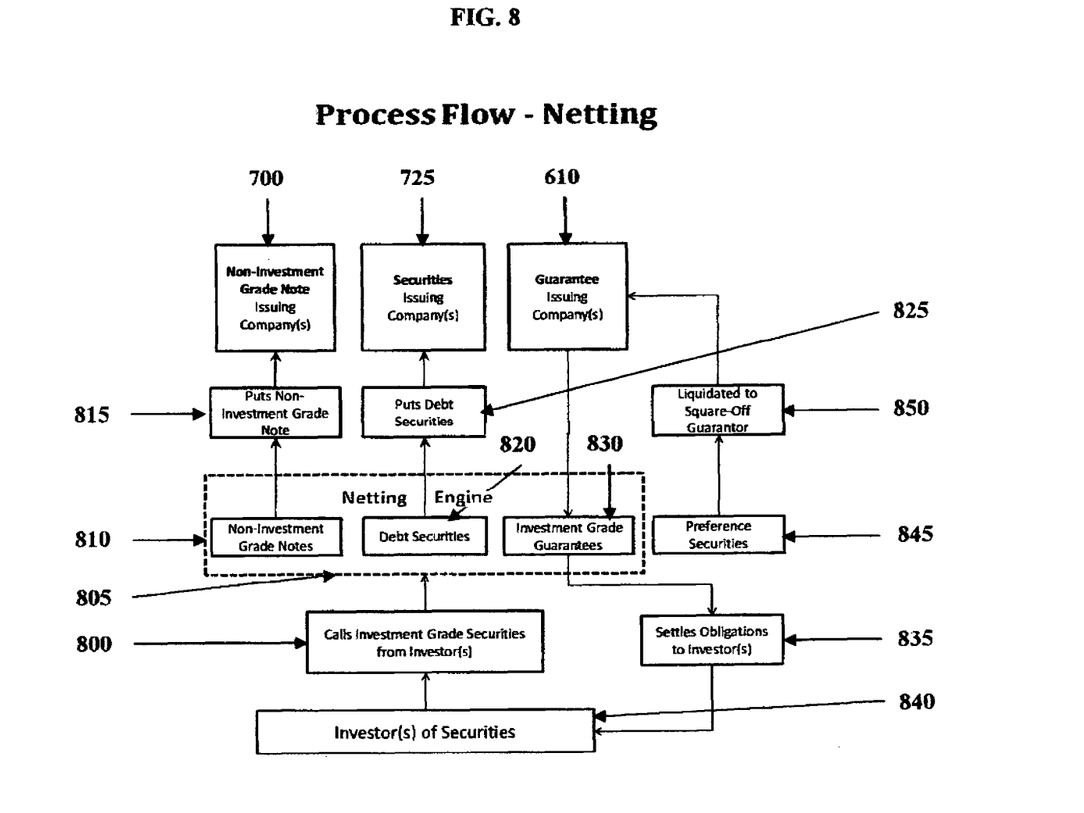
FIG. 8 is a perspective view of a flow diagram of the "Process Flow—Netting" of the present invention.

Referring to the illustrative drawing of FIG. 8, there is shown a flow diagram for the "Process Flow—Netting" which is the process that the system uses to match investments of Issuer Participants 100 with Investor Participants 140 to create a riskless investment hedge against a default of an Issuer Participant 100. Upon an event of default, the netting engine 805 automatically triggers the operation of the hedge with the clearing agent 500 (a.k.a. custodian and settlement agent). The System "Puts" the non-investment grade notes 815 and the debt securities 825 back to the respective issuers (700, 725). Simultaneously, the system "Calls" Investment Grade Securities from Investor(s) 800. The Pricing Algorithm Engine 130 has matched the principal and interest such that the system's receivables are always more than the system's payables. All Issuer Participants 100 and Investor Participants 140 execute a master netting agreement between all of the counterparty participants. When the Platform 110 re-aggregates the securities, the Platform 110 becomes the common counterparty and effectively does a netting of its receivables and payables through the netting engine 805. Upon the netting of the transaction accounts, the investor's shortfall, if any, are made whole by the Guarantee Issuing Company 610. The Preference Securities 845 guarantees any advances or any payments in the event of a defaulted security made by the Guarantee Issuing Company(s) 610.

Figure 9:
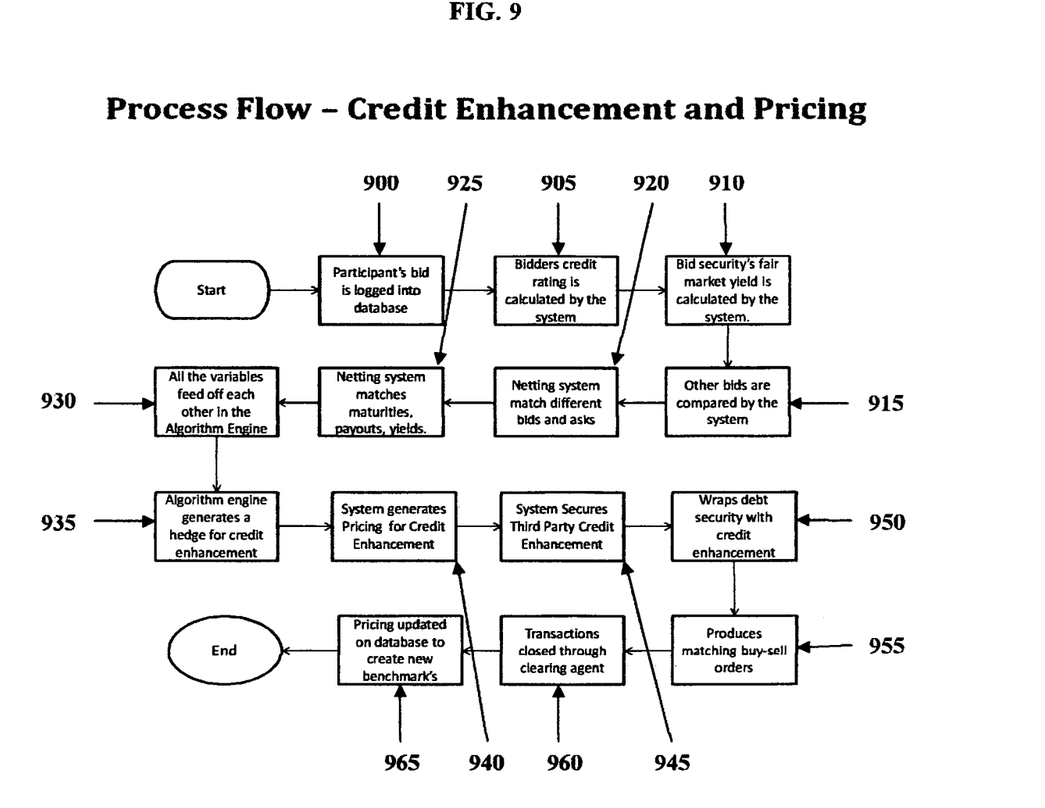
FIG. 9 is a perspective view of a flow diagram of the "Process Flow—Credit Enhancement and Pricing" of the present invention.

Referring to the illustrative drawing of FIG. 9, there is shown a flow diagram for the "Process Flow—Credit Enhancement and Pricing" which is the process that the system uses an Algorithm engine to generate a riskless investment hedge against default of an Issuer Participant 100 as internal credit enhancement and subsequently in real-time generates the Pricing for said Credit Enhancement and further secures it with a wrap financial guaranty insurance policy from a Guarantee Issuing Company(s) 705. The Issuer Participant's 100 bid is logged into database (900, 110, and 215) and their credit rating is calculated by the system 905. The Bid security's fair market yield is calculated by the system 910.

Other Bid securities in the auction environment are compared by the system 915 and the Netting system matches different bids and asks 920 and then matches maturities, payouts, yields 925. All the variables feed off each other in the Algorithm Engine 930 and the Algorithm engine generates a hedge for credit enhancement 935. The System 615 generates Pricing for Credit Enhancement 940 hedge and proceeds and secures Third Party Credit Enhancement 945. The Third Party Credit Enhancement 945 wraps the debt security with external credit enhancement 950. The System produces matching buy-sell orders 955 and these transactions closed through clearing agent (500, 960). Any and all pricing will get updated on the System 665 database (100, 215) and will drive all the debt pricings thereafter 965. The System 665 becomes an intelligent and iterative and interactive System 665 that learns from its own internal pricing algorithms as well as taking environment inputs from other market forces of demand and supply.

Another form and embodiment of the invention is to create trust preferred securities or some similar embodiment issued by a master investor trust purchaser (Investor Participant) linked to various types of Section 3(c)(1) funds and 3(c)(7) funds, including restricted securities pursuant to Rule 144A safe harbor registration requirements of the Securities Act of 1933 ("Reference Funds") and offer such trust preferred securities to non-qualified investors that may not be "qualified purchasers" as defined in the Investment Company Act of 1940 or "accredited investors" (as defined in Regulation D under the Securities Act of 1933). The inventors have found a way to do this without violating the Investment Company Act of 1940 or applicable securities laws.

This would allow a non-qualified investor to participate in the performance of these types of assets without the risk of losing his/her investment since the investor would be participating through investment in a debt security or a master trust that invests in debt securities. Thus, one or more of these structured, linked or stapled investment products can be held by this second reference fund, which those of ordinary skill in the art will understand might, for example, be a holding company or a trust. This second reference fund would then hold such structured financial products, which would offer protection to their principal value. Those of ordinary skill in the art will also understand that the second reference fund can be a legal entity for providing a pool, fund, or other structure that would hold only a single investment issue (e.g., a particular issue of a structured financial product) or asset category (e.g., only bank certificate of deposits or medium term note issuances), or can hold a combination of investment or financial issuers, or categories. In each case, the value of the investment (e.g., the structured financial product, venture capital, private equity, distressed and under-performing assets, equity and loan pools, funds, etc.) would be enhanced due to the value of the hedge on the principal amount of capital invested and typically stable and accreting value over time. In addition, in the context of multi-asset investments, the inclusion of debt securities in the pool of financial assets acquired by the investment company further diversifies the asset base, and as debt securities typically have a credit rating which is above—and a risk envelope which is below—that of the other assets in the investment, the investment as a whole, which can be a structured product, a pool, a fund, a direct contribution or other investment structure has a lower risk with the inclusion of debt securities among its assets.

The combination of the debt security with high-risk investment in a reference fund permits the investor to establish a direct hedge for the high-risk investment at the same time of entering into the high-risk investment in a low risk equity investment. Debt Securities can be incorporated with such investments in various ways.

Using these reference funds as a 'hedge' and as a benchmark for determining the amount of interest to be paid with respect to the borrowing by the bank issuer that is evidenced by the debt securities.

A debt security may be implemented as a structured product investment into an auction delivery platform system converting the debt security into equity interests or beneficial interests of said delivery platform. The environment of said debt security may include one or more reference funds. Said environment may also include the physical environment of one or more physical inputs or physical devices to which said debt security may be linked. Said debt security may interact with other debt securities and with other physical inputs in pools.

There is described herein an embodiment and an arrangement for a trust preferred security and a reference note. The arrangement includes (1) a provision for crediting (a) a collection to (b) principal of the trust preferred security, if the principal of the trust preferred security is not fully credited, and (2) a provision for crediting (a) the collection to (b) principal of the reference note, if the principal of the trust preferred security is fully credited.

An embodiment of a trust preferred security is also described. The trust preferred security includes (1) a provision for crediting (a) a collection to (b) principal of the trust preferred security, if the principal of the trust preferred security is not fully credited, and (2) a provision for crediting (a) the collection to (b) principal of a reference note, if the principal of the trust series certificate is fully credited.

Another embodiment of a trust preferred security includes a provision for crediting (a) a collection for principal of a reference note to (b) principal of the trust preferred security, if the principal of the trust preferred security is not fully credited, and (2) a provision for crediting (a) the collection to (b) principal of the reference note, if the principal of the trust preferred security is fully credited.

Another embodiment of a reference note includes a provision for crediting (a) a collection for principal of the reference note to (b) principal of a trust preferred security, if the principal of the trust preferred security is not fully credited.

It should be understood that various alternatives and modifications could be devised by those skilled in the art. The present invention is intended to embrace all such alternatives, modifications and variances that fall within the scope of the appended claims.

Institutions as issuers are constantly striving to reduce, eliminate and improve the fiscal integrity of their financial statements and balance sheets, debt offerings and investment portfolio's to improve their competitive efficiency, shareholder value, credit ratings, performance valuation, risk management, regulatory functions or overall improved investment operations. If financial instruments can be made with reduced risk and provide financial solutions, investment and portfolio management can become fairer, safer, and more efficient.

In another operation and use of the invention, debt securities may link up with one or more other debt securities to create one or more pools of debt securities ("Pooled Debt Securities") in a new series issue. Debt securities and Pooled Debt Securities may link up with one or more other Debt securities and/or Pooled Debt Securities to trade.

The present invention has been described in terms of certain preferred embodiments. Those of ordinary skill in the art will appreciate that various modifications might be made to the embodiments described here without varying from the basic teachings of the present invention. Consequently the present invention is not to be limited to the particularly described embodiments.

It is to be understood that the invention is not to be limited to the exact configuration as illustrated and described herein. Accordingly, all expedient modifications readily attainable by one of ordinary skill in the art from the disclosure set forth herein, or by routine experimentation there from, are deemed to be within the spirit and scope of the invention as defined herein.

What is claimed is:

1. A method for structured finance, the method comprising:

forming an investment platform by an entity, using a computer or computer network, wherein at least one different entity participates in an online auction system that includes a netting system with an algorithm engine in order to calculate a make-whole algorithm calculation that matches bids, maturities, payouts, and yields, to determine and generate a hedge for credit enhancement;

wherein said make-whole algorithm calculation yields a payment in excess of par for a plurality of benchmark rate fluctuation outcomes;

wherein any declines in benchmark rates have an inverse action on the yield of at least one debt instrument included in a qualified financial contract that secures a certain portion of a future income stream discounted to a present value regardless of the market interest rate environment;

capitalizing said entity with debt and equity investments of said at least one different entity;

issuing, by said at least one different entity, through said investment platform, of at least one debenture that qualifies as a derivative debt security and/or a qualified financial contract that includes a contractual make-whole provision;

wherein any event of payment default by said at least one different entity would constitute a pre-payment that would trigger an offset payment between said at least one debenture of said entity included in said qualified financial contract and said at least one debt instrument of said at least one different entity included in said qualified financial contract to said at least one different entity;

purchasing, by said entity of at least one debt instrument issued by said at least one different entity;

buying and selling in said online auction system, between at least two or more entities using said computer or computer network;

accessing a database of an auction management system, by said at least two or more entities, using said computer or computer network;

issuing, by said at least one different entity, a bid for said at least one debenture included in said qualified debt derivative and/or said qualified financial contract wherein said bid is logged into the database of said auction management system and wherein a credit rating for said at least one debenture is calculated by said auction management system using said computer or computer network;

comparing of other bid securities in the auction environment, by said auction management system, wherein said netting system matches different bids, maturities, payouts, and yields to determine and generate a hedge for credit enhancement including a matching mutuality of debt offset that allows for repayment of an investment;

calculating by said auction management system, of a bid on said qualified debt derivative and/or said qualified financial contract, in order to determine a fair market yield on the security using said computer or computer network;

calculations of the make-whole amount are calculated by the make-whole algorithm using said computer or computer network;

wherein a financial guarantee is provided by an external independent entity in order to credit enhance said at least one debenture included in said qualified debt derivative or said qualified financial contract issued results, and wherein said financial guarantee provided results in an investment grade rating for said debenture issued;

generating pricing for said hedge generated for credit enhancement wherein said pricing generated is utilized by said netting system to secure said external independent entity to provide said credit enhancement;

said credit enhancement partner wraps the debt security with external said credit enhancement;

generating, by said netting system, of matching buy-sell order transactions that are settled by a clearing agent;

updating, using said computer or computer network, of successful bid pricing on the databases of said netting system and said auction management system.

2. The method according to claim 1, wherein said auction management system, said netting system and any pricing algorithms form an interactive system that transforms, learns and adapts to the changes in the market and are inputted into said interactive system.

3. The method according to claim 1, wherein said at least one different entity provides a reverse inquiry offer to buy or sell bid input parameters, including but not limited to:

maturity, price, yield, discount, credit rating, type of securities and principal amounts associated with securities issuances offered for sale and/or purchase on said investment platform, and wherein said at least one different entity is pre-qualified and pre-approved and wherein detailed financial data associated with said entity is available electronically on a database of said investment platform before logging on to said investment platform in order to take part in an offered bid-ask auction system.

4. The method according to claim 1, wherein said at least one different entity input parameters are merged into publically-available financial database which is then incorporated as inputs into said investment platform based investment algorithm that transforms said inputs and generates a term sheet for the issuance of said at least one debenture and a term sheet for the purchase of said at least one debt instrument by said at least one different entity or said entity, and whereby said auction management system, said netting system, said pricing algorithms and any other necessary algorithms that form an interactive offer-bid-ask system extrapolates all prior accepted bid and ask transactions and added to said investment platform database so that said offer-bid-ask system learns through each successful bid and ask transaction and transforms into an adaptive market making mechanism, whereby each prior transaction is used as a new reference to derive an adaptive pricing model.

5. The method according to claim 1, wherein said investment platform uses said computer or computer network and algorithms to calculate and produce an arbitrage or spread opportunity between a bid and ask security pricing based upon the securities unique credit rating, credit weighting and credit profiling, whereby upon acceptance of the terms of issuance of said entity's at least one debenture by said external independent entity excluded from said at least one different entity said at least one debenture issued by said entity is guaranteed by said external independent entity, and whereby upon acceptance of the terms by said at least one different entity and the delivery of said at least one different entity's funds for the purchase of said at least one debenture into an escrow closing account, said securities are then issued by the respective issuers.

6. The method according to claim 1, wherein the maturity of said at least one debenture is perfectly matched to the maturity of said at least one debt instrument of said at least one different entity whereby said at least one debt instrument issuance of said at least one different entity is non-callable by the issuer but can be redeemed at any time by the debt instrument owner for par plus accrued and unpaid interest including the premium under a contractual make-whole provision, whereby said at least one different entity issues said debt instrument with an original issue discount to said entity, and whereby upon contemporaneous closing of an investment transaction between said entity and said at least one different entity, said entity is able to extract a present value monetization of future receivables.

7. The method according to claim 1, wherein said qualified financial contract issued with said at least one debt instrument or said at least one debenture that has an original issue discount is embedded with said contractual make-whole provision, and wherein said event of default by said at least one different entity would constitute said pre-payment that would transform and trigger said offset between said at least one debenture of said entity included in said qualified financial contract and said at least one debt instrument of said at least one different entity included in said qualified financial contract.

8. The method according to claim 1, wherein said at least one debenture issued by said entity included in said qualified financial contract and said at least one debt instrument issued by said at least one different entity included in said qualified financial contract are controlled by a matching mutuality of debt offset pursuant to said master netting agreement, whereby upon event of default by either contractual participant, the non-defaulting party has a right to accelerate the obligation and offset pursuant to said master netting agreement, wherein said computer or computer network calculates and transforms said debt instruments and said debentures included in said qualified financial contract and becomes immediately due and payable and netted against obligations of the defaulting contractual participant to the non-defaulting contractual participant, and whereby the matched investments are fully hedged with the contractual enforceability of said contractual make-whole provision in said qualified financial contract and the underlying said master netting agreement included in said qualified financial contract.

9. The method according to claim 1, wherein upon a default on said at least one debt instrument issued by said at least one different entity, or said at least one debenture issued by said entity, the defaulted debt is offset pursuant to said master netting agreement calculated by said computer or computer network, wherein the defaulting contractual participant is contractually bound to redeem the respective securities at its present value, plus a make-whole premium, the sum of which is always greater than the debt principal redemption or par value, whereby the matched investments are fully hedged with the contractual enforceability of said contractual make-whole provision in said qualified financial contract and the underlying said master netting agreement included in said qualified financial contract, and whereby the non-defaulting contractual participant has the option under said master netting agreement to suspend its interest payment obligations to the defaulting contractual participant during the period of close-out netting pursuant to said master netting agreement.

10. The method according to claim 1, wherein said entity can internally credit enhance said at least one debenture issuance to said at least one different entity by simultaneously investing in said at least one debt instrument issued by said at least one different entity thereby achieving a matching debt mutuality, wherein each contractual participant owes a debt to the opposing contractual participant, between common counter-participants and contractually linking the obligations of both participants respective securities within the provisions of said master netting agreement.

11. The method according to claim 1, wherein said entity can obtain an external credit guarantee from a non-contractual participant without providing any underlying collateral for said at least one debenture issued by said entity, based upon the inherent credit enhancement provided by said master netting agreement, or coverage by a support agreement wherein said entity would pledge its respective assets to said non-contractual participant in support of a financial guarantee from said non-contractual participant to pay any obligations that might arise on default of said entity.

12. The method according to claim 1, wherein a portion of the proceeds of the present value monetization are reinvested in highly rated zero-coupon sovereign bonds, such as but not exclusive to U.S treasuries with maturities matching said at least one debt instrument issued by said at least one different entity included in said qualified financial contract, and wherein the redemption value of an investment in zero-coupon sovereign bonds results in an amount that equals the present value monetization thereby ensuring principal protection of said at least one different entity's debt issuances.

13. The method according to claim 1, including a hedging algorithm,
a proprietary make-whole algorithm,
a proprietary pre-payment algorithm,
a master netting agreement, comprising;

matching a floating rate structure to provide an interest rate hedge by calculating, using said computer module and/or computer network readable medium, said hedging algorithm, said make-whole algorithm and said payment algorithm that calculates a payment in excess of par for all possible benchmark rate fluctuations or iterative combinations, wherein any declines in benchmark rates have an inverse action on the yield of the investment instruments and on the amount holders receive upon acceleration, tracking benchmark rates using said payment algorithm benchmarked to the same benchmark index that is linked to other investment instruments that can be used in a cross transaction between buyers and sellers on said investment platform, and calculating the termination values payment of the defaulting participant pursuant to said master netting agreement that would equal the sum of the present value of the defaulted investment instrument and the value of the make-whole provision using said make-whole algorithm.

14. The method according to claim 1 comprising,
wherein an automated market-making exchange trading-platform system conducts instantaneous and simultaneous settlement supporting trading of securities that includes an account holding system further comprising:

tracking the reverse bid of the account of a buyer, whereby the account of the buyer offers for sale at least one debt instrument at a discount, tracking an account of a seller, whereby the account of said seller includes a measure of sellers accepted trade consideration, maintaining a system for holding accounts of at least one said seller and at least one said buyer, and facilitating a contemporaneous exchange of said sellers ownership of the investment instrument and the measure of said buyer's consideration between the two entities upon agreement on price and quantity.

15. A system for structured finance, comprising,
an investment platform,
a computer module and/or computer network readable medium for conducting an online bid-ask system that includes a netting system, further comprising:

instruction code for causing said computer module and/or computer network readable medium to perform calculating functions involving a bid-ask algorithm and a hedging algorithm;

instruction code for enabling electronic communications between an entity and at least one different entity that participate in said investment platform;

instruction code for calculating the ask price for sellers of investment instruments and the bid price for buyers of investment instruments that forms part of said investment platform system between said entity and said at least one different entity;

instruction code for matching the ask price of the seller of the investment instrument to the bid price of the buyer of the investment instrument that forms part of said investment platform system between said entity and said at least one different entity, either of which can be a seller or a buyer through said investment platform system;

instruction code for tracking prices of insurances for investment instruments provided for sale by independent participants that are not buyers or sellers of investment instruments on said investment platform system;

instruction code for enabling either said entity or said at least one different entity to sell investment instruments issued by either said entity or said at least one different entity;

instruction code for enabling said entity or said at least one different entity to purchase investment insurance from other buyers and sellers on said investment platform system or from independent participants that are not buyers and sellers of investment instruments on said investment platform system;

wherein the above modules and/or instruction codes are executed by said computer module and/or computer network readable medium.

16. The system according to claim 15 comprising:
an online-based secured automated market-making exchange trading system;

an automated Dutch-auction arbitrage trading-account system configured to enable participation by said entity and said at least one different entity via a secure network under a bid-ask system;

instruction code for determining structure and pricing for investment instruments, instruction code for calculating present value monetization on a matched bid-ask transaction, instruction code for determining the timing of interest payments on investment instruments that are debt instruments, instruction code for determining the amount of an investment allocation of a present value monetization, instruction code for operating said make-whole algorithm that matches variable pay-ins and pay-outs based upon up or down movements in a selected benchmark rate or indices, instruction code for calculating the make-whole provision amount in case of a default of an investment instrument by an issuer of an investment instrument, instruction code for determining the most favorable investor participant based on the pricing derived from the pricing algorithm in said bid-ask algorithm, instruction code for operating said bid-ask system that can extrapolate all prior accepted bid and ask transactions that is added to a database of said investment platform system, whereby said bid-ask system adapts from each successful bid and ask transaction and becomes an adaptive market making mechanism whereby each prior transaction is used as a new reference to derive an adaptive pricing model, and wherein the above modules and/or instruction codes are executed by said computer module and/or computer network readable medium.

* * * * *